(12) United States Patent
Ryu et al.

(10) Patent No.: US 8,606,303 B2
(45) Date of Patent: *Dec. 10, 2013

(54) VERIFYING AVAILABILITY OF IDLE-MODE MOBILE SUBSCRIBER STATION IN WIRELESS ACCESS SYSTEM

(75) Inventors: Gi Seon Ryu, Seoul (KR); Beom Joon Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 448 days.

This patent is subject to a terminal disclaimer.

(21) Appl. No.: 12/371,526

(22) Filed: Feb. 13, 2009

(65) Prior Publication Data

US 2009/0156192 A1 Jun. 18, 2009

Related U.S. Application Data

(63) Continuation of application No. 11/691,410, filed on Mar. 26, 2007, now Pat. No. 7,505,776, which is a continuation of application No. 11/165,744, filed on Jun. 24, 2005, now Pat. No. 7,505,775.

(30) Foreign Application Priority Data

| Jun. 25, 2004 | (KR) | 10-2004-0048431 |
| Jul. 10, 2004 | (KR) | 10-2004-0053790 |
| Sep. 25, 2004 | (KR) | 10-2004-0077649 |
| Mar. 8, 2005 | (KR) | 10-2005-0019211 |

(51) Int. Cl.
*H04W 68/00* (2009.01)

(52) U.S. Cl.
USPC ........ 455/458; 455/127.5; 455/343; 455/515; 455/522; 455/574; 370/311

(58) Field of Classification Search
USPC .............. 455/458, 343, 127.5, 515, 522, 571; 370/311
See application file for complete search history.

(56) References Cited

U.S. PATENT DOCUMENTS

| 5,519,706 A | 5/1996 | Bantz et al. |
| 5,588,043 A | 12/1996 | Tiedemann, Jr. et al. |
| 5,642,398 A | 6/1997 | Tiedemann, Jr. et al. |

(Continued)

OTHER PUBLICATIONS

Yong Chang, Jun. 25, 2004, IEEE 802.16 Broadband Wireless Access Working Group: Quick Connection set up in idle mode.*

(Continued)

*Primary Examiner* — Kamran Afshar
*Assistant Examiner* — Sayed T Zewari
(74) *Attorney, Agent, or Firm* — H.C. Park & Associates, PLC (57) ABSTRACT

A method of verifying availability of a mobile subscriber station that is in an idle-mode includes requesting to a base station by the mobile subscriber station to enter an idle-mode, wherein the base station is associated with a paging group comprising a plurality of base stations, and receiving from the base station an idle-mode response command to enter the idle-mode. The method also includes receiving from the base station a paging command comprising an action code associated with performing ranging while the mobile subscriber station is in the idle-mode to verify availability of the mobile subscriber station with respect to the base station, wherein if the ranging is not successfully performed with the base station during a predetermined period, the base station continues to transmit the paging command until a paging retrial count reaches a predetermined threshold.

5 Claims, 4 Drawing Sheets

(56) References Cited

U.S. PATENT DOCUMENTS

| | | | |
|---|---|---|---|
| 6,178,164 B1 | 1/2001 | Wang et al. | |
| 6,212,175 B1 | 4/2001 | Harsch | |
| 6,240,288 B1 | 5/2001 | Wan et al. | |
| 6,490,455 B1 | 12/2002 | Park et al. | |
| 6,678,258 B1 | 1/2004 | Capurka et al. | |
| 7,336,953 B2 | 2/2008 | Kim et al. | |
| 2001/0050907 A1* | 12/2001 | Madour et al. | 370/329 |
| 2003/0063579 A1 | 4/2003 | Lee | |
| 2004/0048610 A1* | 3/2004 | Kim et al. | 455/422.1 |
| 2005/0277429 A1 | 12/2005 | Laroia et al. | |
| 2006/0025134 A1 | 2/2006 | Cho et al. | |

OTHER PUBLICATIONS

IEEE 802.16 Broadband Wireless Access Working Group; MSS Idle Mode: IEEE publication IEEE C802.16e-04/42r7 (Mar. 18, 2004).
IEEE 802.16 Broadband Wireless Access Working Group; MSS Idle Mode: IEEE publication IEEE C802.16e-04/42r7 (Mar. 18, 2007).
DongWoo K. et al., "Improving Idle handoff in CDMA Mobile Systems: IEEE Communications Letters", vol. 2, Issue 11, Nov. 1998, pp. 304-306.
Non-Final Office Action of U.S Appl. No. 11/165,744 dated May 4, 2007.
Non-Final Office Action of U.S Appl. No. 11/165,744 dated Mar. 5, 2008.
Notice of Allowance of U.S Appl. No. 11/165,744 dated Nov. 7, 2008.
Non-Final Office Action of U.S Appl. No. 11/691,410 dated Sep. 4, 2007.
Final Office Action of U.S Appl. No. 11/691,410 dated Apr. 29, 2008.
Notice of Allowance of U.S Appl. No. 11/691,410 dated Nov. 10, 2008.
Non-Final Office Action of U.S Appl. No. 12/398,072 dated May 17, 2011.
Final Office Action of U.S Appl. No. 12/398,072 dated Oct. 5, 2011.
Notice of Allowance of U.S Appl. No. 12/398,072 dated Jan. 5, 2012.
Non-Final Office Action of U.S Appl. No. 12/398,084 dated Feb. 22, 2011.
Non-Final Office Action of U.S Appl. No. 12/398,084 dated Jul. 8, 2011.
Notice of Allowance of U.S Appl. No. 12/398,084 dated Jan. 11, 2012.
Notice of Allowance issued on Jul. 16, 2013 in U.S Appl. No. 12/398,072.
Notice of Allowance dated Oct. 16, 2012 issued for U.S Appl. No. 12/398,084.

\* cited by examiner

FIG. 1

| Field | Size | Notes |
|---|---|---|
| MOB_PAG-ADV_Message_format(){ | | |
| Managenent Message type ?? | 8 bits | |
| Num_Paging Group IDs | 8 bits | Number of Paging Group Ids in this message |
| For(i=0; i<Num_Paging_Group_IDs; I) { | | |
| Paging Group ID | 8 bits | |
| } | | |
| For(j=0;j<Num_MACs; j++) { | | Number of MSS MAC Addresses in message can be determined from the length of the message (found in the generic MAC hdader.) |
| MSS MAC address hash | 24 bits | The hash is obtained by computing a CRC24 on the MSS 48-bit MAC address. The polynomial for the calculation is 0x864CFB. |
| Action Code | 2 bits | Paging action instruction to MSS 00=No Action Required 01=Perform Ranging to establish location and acknowledge message 10-Enter Network 11=Reserved |
| Reserved | 6 bits | |
| } | | |
| } | | |

VERIFYING AVAILABILITY OF IDLE-MODE MOBILE SUBSCRIBER STATION IN WIRELESS ACCESS SYSTEM

CROSS-REFERENCE TO RELATED APPLICATIONS

This application is a continuation of U.S. application Ser. 11/691,410, filed Mar. 26, 2007 now U.S. Pat. No. 7,505,776, which is a continuation of U.S. application Ser. No. 11/165,744, filed Jun. 24, 2005 now U.S. Pat. No. 7,505,775, which pursuant to 35 U.S.C. §119(a), claims the benefit of earlier filing date and right of priority to Korean Application No. 10-2004-0048431, filed on Jun. 25, 2004; Korean Application No. 10-2004-0053790, filed on Jul. 10, 2004; Korean Application No. 10-2004-0077649, filed on Sep. 25, 2004; and Korean Application No. 10-2005-0019211, filed on Mar. 8, 2005, the contents of which are hereby incorporated by reference herein in their entirety.

FIELD OF THE INVENTION

The present invention relates generally to a wireless access system and, more particularly, to verifying availability of an idle-mode mobile subscriber station in a wireless access system.

BACKGROUND OF THE INVENTION

Broadband wireless access systems typically support an idle-mode to minimize the power consumption of a mobile subscriber station (MSS). During the idle-mode, the MSS does not perform a handover procedure when moving between base stations in the same paging zone. Therefore, the MSS does not need to transmit uplink information for the handover procedure, which reduces corresponding power consumption.

A paging zone is defined as a zone that is controlled by a plurality of base stations called a paging group. Each of the base stations in the paging group has the same paging cycle (Paging_Cycle) and the same paging offset (Paging_Offset).

The MSS may make a request to a base station to switch to the idle-mode. The base station then provides a paging message including its paging-group ID, a corresponding paging cycle, and a corresponding paging offset. The corresponding MSS may thus be switched to the idle-mode. During the idle-mode, the MSS may determine whether to continue or terminate the idle-mode based on the paging message provided by the base station at each paging cycle.

If traffic needs to be transmitted by the MSS while in the idle-mode, the MSS may terminate the idle-mode. For example, the MSS may be enabled to terminate the idle-mode by the BS. Furthermore, if the MSS moves to another paging zone or loses its sync while in an idle-mode and is unable to receive a paging at a predefined time, the MSS may terminate the idle-mode.

When the MSS is in the idle-mode, the MSS normally receives a periodic paging to secure its free move in the same paging zone without performing the handover procedure as long as there exists no traffic to receive or transmit.

A procedure of an MSS entering an idle-mode is explained in detail as follows. The MSS delivers an idle-mode request message to a serving BS to enter the idle-mode. The serving BS provides a paging group ID, a paging cycle, a paging offset to the MSS via an idle-mode response message. The serving BS also releases connection information to the MSS, as well as radio resources allocated to the MSS. Furthermore, the serving BS provides a MAC address of the MSS entering the idle-mode to BSs of its paging group so that each of the BSs may page the corresponding MSS by the same paging cycle.

The MSS is allowed to enter the idle-mode via the idle-mode response message after a determination of whether there is downlink traffic that needs to be delivered to the MSS by evaluating a paging message of a broadcast format delivered from the BS according to the paging cycle. Determinations are also made of whether to perform a ranging and whether to maintain the idle-mode.

Figure 1:
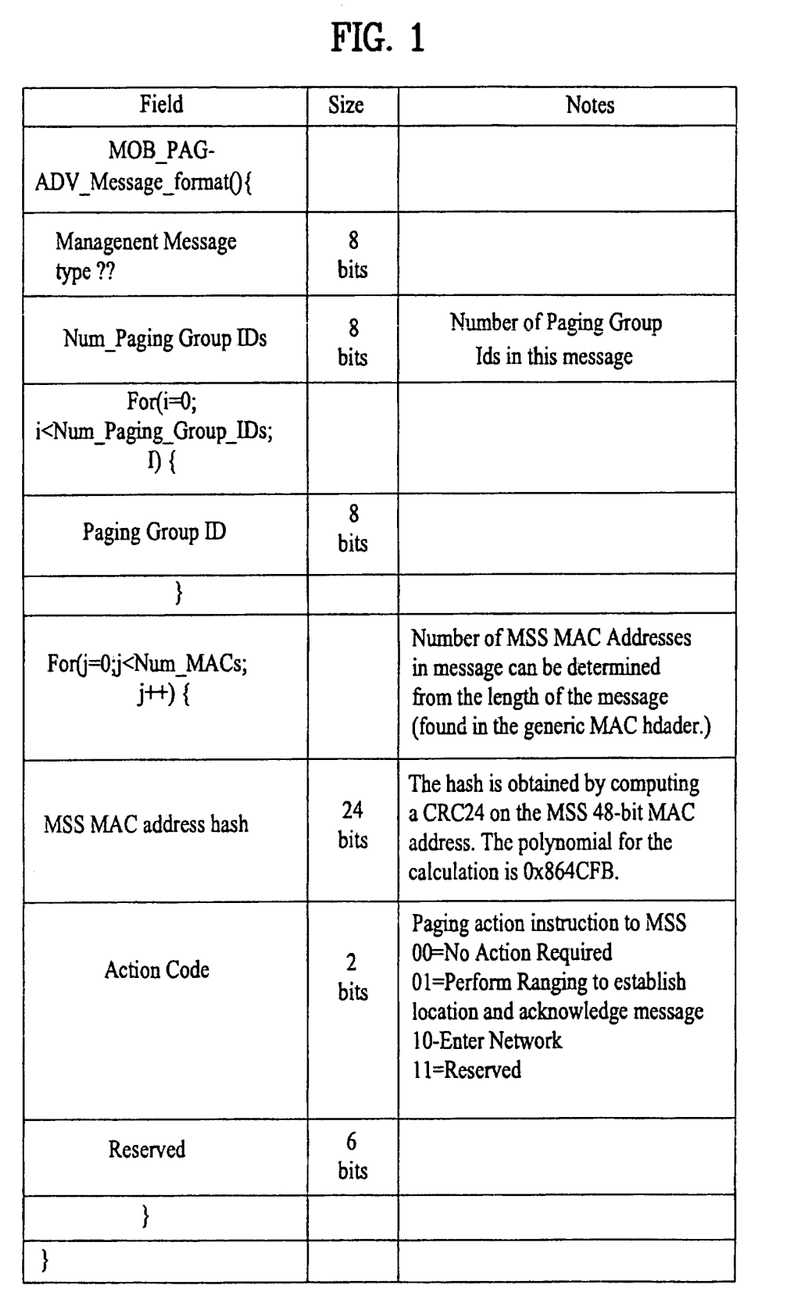
FIG. 1 is a diagram showing a format of a paging message received by an idle-mode mobile subscriber station (MSS) from a base station (BS).

FIG. 1 is a diagram showing a format of a paging message received by an idle-mode mobile subscriber station (MSS) from a base station (BS).

Referring to FIG. 1, if the paging message states that there is downlink traffic for the MSS, the MSS terminates the idle-mode and re-registers at a network to receive the downlink traffic. If the MSS is requested to perform ranging via the paging message, the MSS performs the ranging to allow the BS to update a location of the MSS and an idle-mode MSS list. If the paging message instructs the MSS to take no action, the MSS maintains the idle-mode.

Thereafter, if uplink or downlink traffic needs to be communicated or if the paging group is handed over to another BS to terminate the MSS idle-mode, the BS informs the other BSs belonging to the same paging group so that the other BSs may remove the corresponding MSS from the idle-mode MSS list.

When the MSS is in the idle-mode, the MSS normally does not have uplink traffic. Thus, in order to provide continuous availability of the MSS, the BS delivers the paging message to the MSS to enable the corresponding MSS to perform the ranging. The BS may verify the availability of the MSS only after receiving uplink information via a ranging request from the MSS.

However, when the MSS is powered off, or when the MSS lies in a poor channel environment, the MSS may fail to receive the paging message even if the BS sets up the paging message (e.g., an action code is set to '0×01 (perform ranging)' or '0×02 (enter network)') for delivery. Also, in such case, the BS may not receive the ranging request message from the MSS. Thus, if the MSS is unable to normally operate, the BS may determine that the MSS is no longer available. Furthermore, the BS may need to release all management resources (e.g., MAC address for paging, etc.) for the corresponding MSS and have other BSs of the same paging group remove the corresponding MSS from their idle-mode MSS lists.

SUMMARY OF THE INVENTION

Accordingly, the present invention is directed to verifying availability of an idle-mode mobile subscriber station in a wireless access system that substantially obviates one or more problems of the related art.

An object of the present invention is to provide a method of updating a list of available idle-mode mobile subscriber stations (MSSs) by a base station (BS) using a paging message delivered to MSSs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of verifying availability of a mobile subscriber station that is in an idle-mode includes requesting to a base station by the mobile subscriber station to enter an idle-mode, wherein the base station is associated with a paging group comprising a plurality of base stations, and receiving from the base station an idle-mode response command to enter the idle-mode, the idle-mode response command comprising at least one of the paging identifier, a paging cycle and a paging cycle offset. The method also includes receiving from the base station a paging command comprising an action code associated with performing ranging while the mobile subscriber station is in the idle-mode to verify availability of the mobile subscriber station with respect to the base station, wherein if the ranging is not successfully performed with the base station during a predetermined period, the base station continues to transmit the paging command until a paging retrial count reaches a predetermined threshold.

The paging command may preferably be received when there is no downlink data. When the paging retrial count reaches the predetermined threshold, then the mobile subscriber station may preferably be removed from an idle-mode list maintained by the base station. The removal of the mobile subscriber station of the idle-mode list may preferably be performed in each one of the plurality of base stations in the paging group.

The predetermined period may preferably be the paging cycle. Alternatively, the predetermined period may be based on a time expiration associated with a maximum allotted time for the mobile subscriber station to send a ranging request in response to the paging command from the base station.

When the paging retrial count reaches the predetermined threshold, then the mobile subscriber station may preferably be removed from an idle-mode list maintained by a paging controller. The paging command may preferably be received when there is traffic data to be downlinked to the mobile subscriber station.

In another embodiment, a method of verifying availability of a mobile subscriber station that is in an idle-mode includes requesting to a paging controller by the mobile subscriber station to enter an idle-mode, wherein the paging controller is associated with a paging group comprising a plurality of base stations, and receiving from the paging controller an idle-mode response command to enter the idle-mode, the idle-mode response command comprising at least one of the paging identifier, a paging cycle and a paging cycle offset. The method also includes receiving from the paging controller a paging command comprising an action code associated with performing ranging while the mobile subscriber station is in the idle-mode to verify availability of the mobile subscriber station with respect to the paging controller, wherein if the ranging is not successfully performed with the paging controller during a predetermined period, the paging controller continues to transmit the paging command until a paging retrial count reaches a predetermined threshold.

In yet another embodiment, a method of verifying availability of a mobile subscriber station that is in an idle-mode includes receiving from the mobile subscriber station a request to enter an idle-mode, wherein a base station is associated with a paging group operatively connected to a plurality of base stations, and transmitting to the mobile subscriber station an idle-mode response command to enter the idle-mode in response to the request to enter the idle-mode, the idle-mode response command comprising at least one of the paging identifier, a paging cycle and a paging cycle offset. The method also includes transmitting to the mobile subscriber station a paging command comprising an action code associated with performing ranging while the mobile subscriber station is in the idle-mode to verify availability of the mobile subscriber station with respect to the base station, wherein if the ranging is not successfully performed with the base station during a predetermined period, the base station continues to transmit the paging command until a paging retrial count reaches a predetermined threshold.

It is to be understood that both the foregoing general description and the following detailed description of the present invention are exemplary and explanatory and are intended to provide further explanation of the invention as claimed.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

In one embodiment, the present invention is implemented in a broadband wireless access system. In another embodiment, the present invention is implemented in a wireless communication system operating according to a non-broadband standard.

In yet another embodiment, when a mobile subscriber station (MSS) is in idle-mode, it checks for a perform ranging command from a serving base station (serving BS) at every paging cycle. In other words, the serving BS periodically send a perform ranging command to the MSS to check whether the MSS is "alive". If a perform ranging command is present, then the MSS may send a ranging request to the serving BS.

If the serving BS does not receive a ranging request from the MSS, then the serving BS may repeatedly sends the perform ranging command until a paging retrial threshold is met. Once the paging retrial threshold is met, the serving BS removes the MSS from the idle-mode MSS list.

In still another embodiment, a MSS enters an idle-mode and a serving BS is enabled to verify availability of the MSS using various parameters, including a Paging Retrial Count, and an Uplink Information Reception Standby Time (Ranging Request Message Reception Standby Time). A mobile subscriber station is referred to as a MSS, regardless of whether or not it is in the idle-mode.

The availability of the MSS may be verified using the Paging Retrial Count, and the Uplink Information Reception Standby Time. Alternatively, the availability of the MSS may be verified using the Paging Retrial Count only. Alternatively, the availability of the MSS may be verified using the Uplink Information Reception Standby Time only. The Uplink Information Reception Standby Time may preferably be set equal to a paging cycle. Alternatively, the Uplink Information Reception Standby Time may preferably be determined by a timer.

The MSS may lose synchronization of the paging messages periodically delivered from the serving BS, causing the MSS to fail to receive the paging messages from the serving BS. If the MSS fails to receive the paging messages from the serving BS, the MSS may perform a re-registration procedure to the network. On the other hand, if the serving BS fails to receive uplink information from the MSS, despite requiring the MSS to send the uplink information via the paging message, the serving BS may preferably decide that the MSS is unavailable.

The paging message is set up to deliver a ranging request to the serving BS from the MSS. The MSS may deliver the ranging request to the serving BS via a competition-based uplink ranging channel. If the serving BS requests a ranging execution from the MSS, but fails to receive the ranging request message from the MSS for a specified duration of a Ranging Request Message Reception Standby Time, the serving BS may preferably determine that the ranging has failed.

Figure 2:
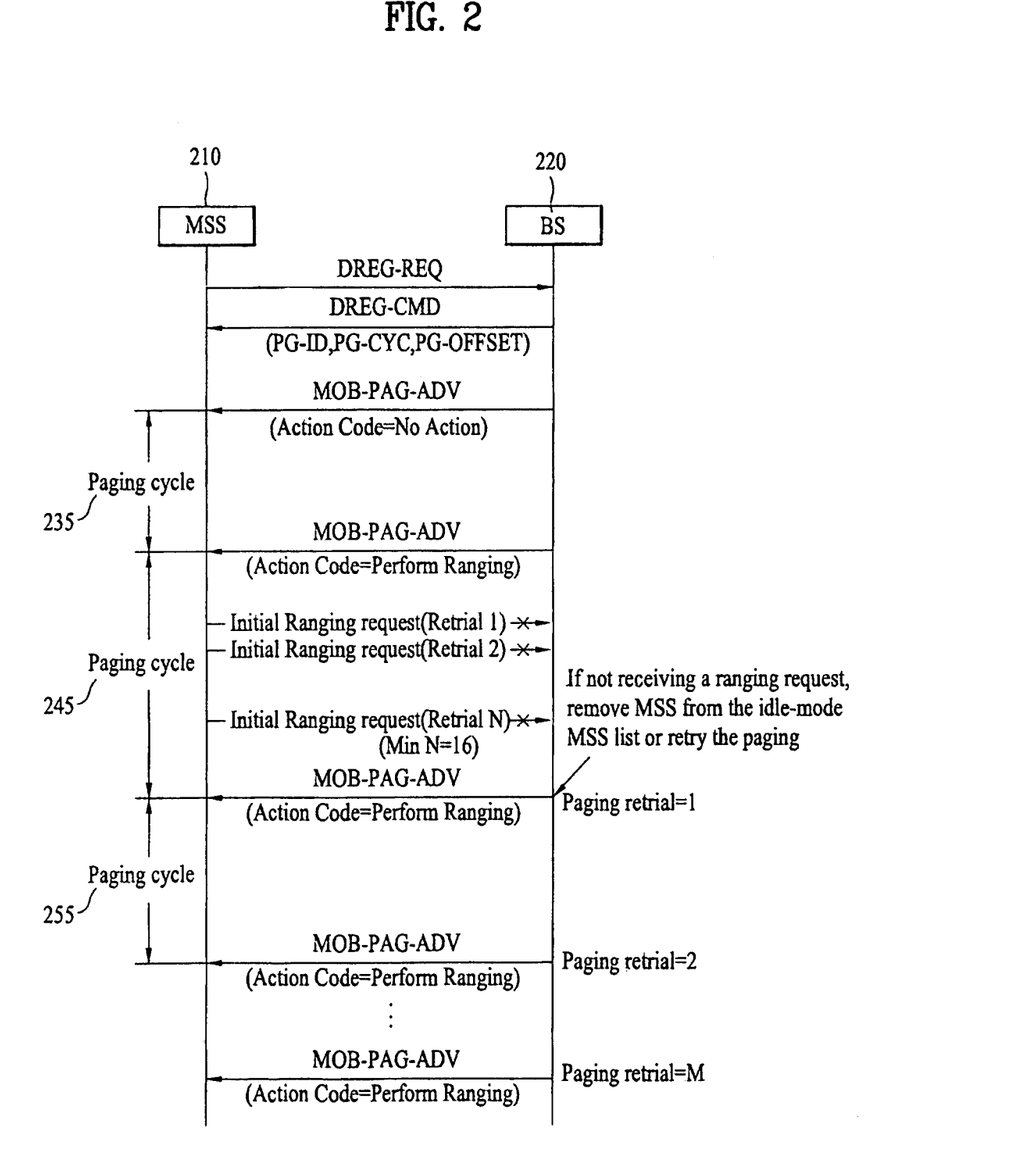
FIG. 2 is a diagram showing verifying of availability of an MSS based on a paging cycle in a wireless access system, according to one embodiment of the present invention.

FIG. 2 is a diagram showing verifying of availability of an MSS based on a paging cycle in a wireless access system, according to one embodiment of the present invention.

Referring to FIG. 2, the MSS 210 enters the idle-mode by delivering a registration release request (DREG-REQ) message to the serving BS 220. The serving BS 220 responds to the DREG-REQ message by delivering a paging group ID (PG-ID), a paging cycle (PG-CYC), and a paging offset (PG-OFFSET) to the MSS 210. The serving BS 220 also may release connection information to the MSS 210, and radio resources allocated to the MSS 210.

The serving BS 220 then provides a MAC address of the MSS 210 entering the idle-mode to BSs of the serving BS 220 paging group to enable each of the BSs to page the MSS 210 by the same paging cycle. For example, each of the BSs may preferably transmit a paging message (MOB-PAG-ADV) to instruct the MSS 210 to request a ranging.

The MSS 210 may be allowed to enter the idle-mode via the registration release command (DREG-PAG-ADV), and may determine whether downlink traffic has been delivered to the MSS 210 via the broadcast-formatted paging message delivered from the serving BS 220 according to the paging cycle. The MSS 210 also may determine whether to execute the ranging and/or whether to maintain the idle-mode. In verifying the availability of the MSS 210 in FIG. 2, the paging cycle and the paging retrial count may be utilized.

After transmitting the paging message (MOB-PAG-ADV) (Action Code=perform ranging or network entry) to the MSS 210, the serving BS 220 stands by for the paging cycle until a ranging request message is received from the MSS 210. If the serving BS 220 does not receive uplink information from the MSS 210 before the time for delivering the next paging message, e.g. after expiration of the paging cycle, the serving BS 220 may preferably determine that the ranging has failed (ranging failure). In such case, the availability of the MSS 210 may be verified using Uplink Information Reception Standby Time. The serving BS 220 may determine that the MSS 210 is not available and remove the MSS 210 from an idle-mode MSS list. Alternatively, a paging controller that is connected to a plurality of BSs may determine that the MSS 210 is not available and remove the MSS 210 from an idle-mode MSS list.

The paging retrial count indicates a count of retrials made by the serving BS 220 failing in receiving the ranging request from the MSS 210. The serving BS 220 may deliver the paging message ((MOB-PAG-ADV) (Action Code=perform ranging or network entry)) including a predefined paging retrial count to the MSS 210. If the serving BS 220 fails to receive the ranging request from the MSS 210 despite delivery of the paging message, the serving BS 220 may preferably determine that the MSS 210 is not available and remove the MSS 210 from an idle-mode MSS list. Thus, the availability of the MSS 210 may be verified using two parameters, paging cycle and paging retrial count.

If the serving BS 220 receives the ranging request from the MSS 210, the serving BS 220 (or paging controller) may update the availability of the MSS 210 via the idle-mode MSS list and notify the BSs belonging to the same paging group to enable the BSs belonging to the same paging group to update their idle-mode lists, via a backbone message.

On the other hand, if the serving BS 220 fails to receive the ranging request from the MSS 210 within a predetermined time via a setup of the paging cycle and paging retrial, the serving BS may preferably remove the MSS 210 from an available idle-mode MSS list and release management resources and information associated with the MSS 210. The serving BS 220 may also preferably use a backbone message to notify the BSs belonging to the same paging group to remove the MSS 210 from their idle-mode MSS lists.

Figure 3:
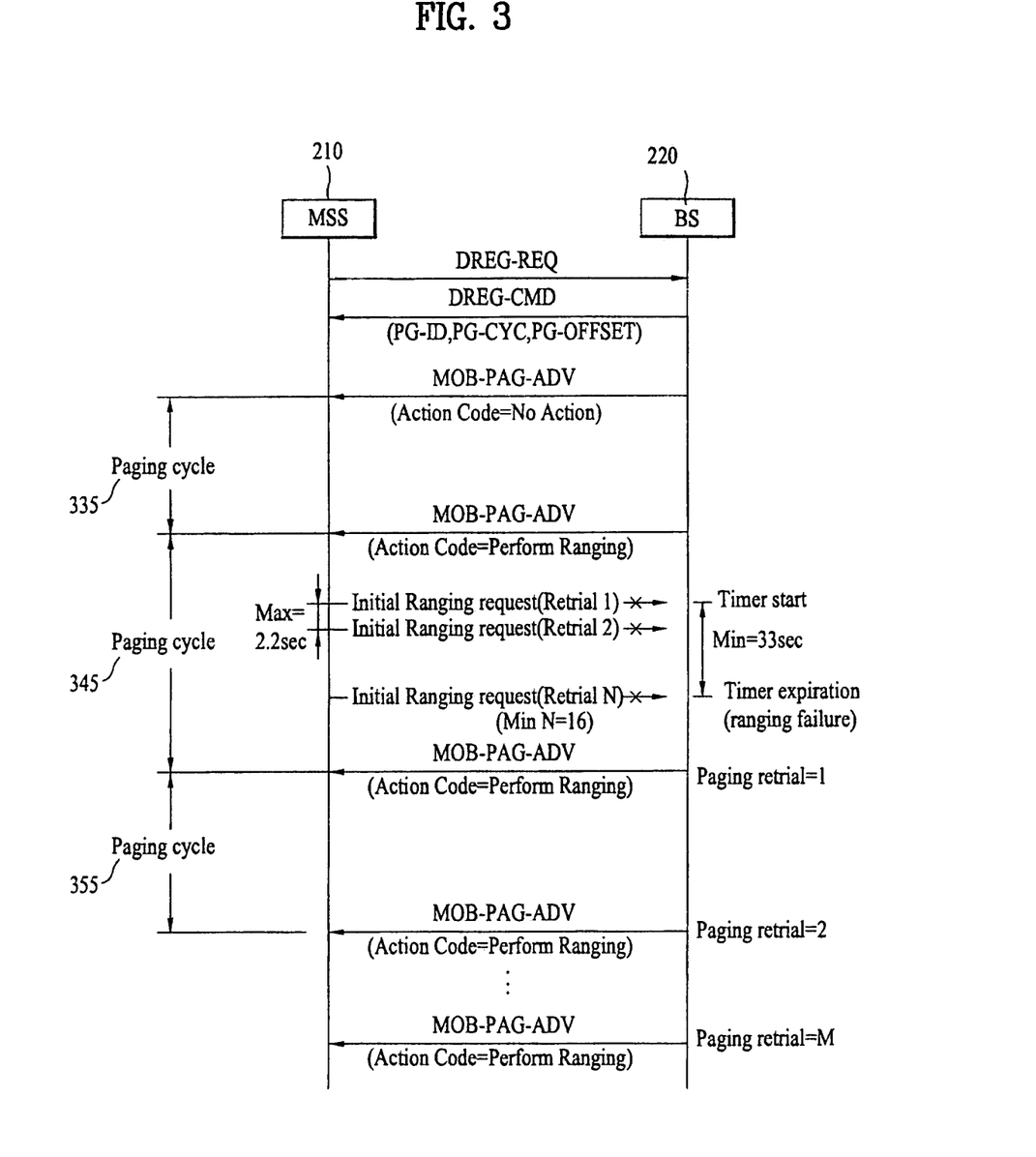
FIG. 3 is a diagram showing verifying of availability of an MSS using a timer in a wireless access system, according to one embodiment of the present invention.

FIG. 3 is a diagram showing verifying of availability of an MSS using a timer in a wireless access system, according to one embodiment of the present invention.

Referring to FIG. 3, the availability of the MSS 210 may be verified using a timer and a paging retrial count.

After transmitting the paging message (MOB-PAG-ADV) (Action Code=perform ranging or network entry), the serving BS 220 may stand by for an operational time of the timer until a ranging request message is received from the MSS 210. If the serving BS 220 does not receive uplink information from the MSS 210 before the time for delivering the next paging message (based on expiration of the timer), the serving BS 220 may preferably determine that the ranging has failed. When verifying the availability of the MSS 210 through uplink information reception standby time only, the serving BS 220 may preferably determine that the MSS 210 is not available and remove the MSS 210 from an idle-mode MSS list.

The serving BS 220 may deliver the paging messages ((MOB-PAG-ADV) (Action Code=perform ranging or network entry)) including a predefined paging retrial count to the MSS 210. If the serving BS 220 fails to receive the ranging request from the MSS 210 despite the delivery of the paging messages, the BS may decide that the MSS 210 is not available and remove the MSS 210 from an idle-mode MSS list.

The availability of the MSS 210 may be verified via two parameters, paging cycle and paging retrial count. The availability of the MSS 210 may be determined according to a setup of each parameter.

In one embodiment, if an operational cycle of the timer is lower than the paging cycle, the serving BS 220 may determine the availability of the MSS 210 via the paging retrial count. In updating the availability of the MSS 210 via the paging retrial count, it may be unnecessary to use the timer. For example, if the serving BS 220 fails to receive the uplink information from the MSS 210 before a next paging time begins (after the delivery of the paging message (MOB-PAG-ADV)), the serving BS 220 may determine that a ranging failure has occurred and perform a paging retrial. In another embodiment, when the paging retrial count is set to zero, if the timer expires after the paging message is delivered to make the MSS 210 request an initial ranging, the serving BS 220 may determine that the MSS 210 is not available.

In yet another embodiment, a ranging request of the MSS 210 is performed via a competition-based ranging channel. That is, the paging command may not be based on the paging cycle. Instead, the retry of perform ranging is based on expiration of the timer. The timer expiration may be based on the maximum allotted time for the MSS 210 to send a ranging request. In this embodiment, a similar procedure to that of the initial ranging may be used. The MSS 210 may preferably stand by for a maximum 200 ms waiting for a ranging response message after the delivery of the ranging request message to the serving BS 220. After receiving the ranging response message from the serving BS 220, the MSS 210 may stand by for a maximum of two seconds to deliver the next ranging request message. The standby time of a maximum of two seconds may be applied to re-transmitting a next ranging request message due to failure to receive the ranging response message. In still another embodiment, the ranging request retrial count of the MSS 210 is at least sixteen. Thus, by utilizing the two standby times and the ranging request retrial, the ranging request standby time of the serving BS 220 may be determined according to the timer. In yet another embodiment, the corresponding standby time is at least thirty-three seconds.

In still another embodiment, when the serving BS 220 has previously assigned an uplink channel for the ranging to the MSS 210 via the paging message (MOB-PAG-ADV), it is unnecessary that all BSs belonging to the paging group assign the uplink ranging channel to the MSS 210 for an extended duration. Thus, in this embodiment, the availability verification of the MSS 210 via the timer may be mandatory. In the case of mandatory availability verification, the timer may be set up by a frame unit. If there is no ranging request from the MSS 210 within the set frame unit, the serving BS 220 may release the uplink channel assigned to the MSS 210 and remove the MSS 210 from the idle-mode MSS list.

In one embodiment, if the serving BS 220 receives the ranging request from the MSS 210, the serving BS 220 may update the availability of the MSS 210 via the idle-mode MSS list and send a backbone message to enable other BSs belonging to the same paging group to update their idle-mode MSS lists.

In another embodiment, if the serving BS 220 fails to receive the ranging request from the MSS 210 within the time predefined via the timer and the paging retrial setup, the serving BS 220 may remove the MSS 210 from the idle-mode MSS list and release management resources and information associated with the MSS 210. The serving BS 220 may also use the backbone message to notify the BSs belonging to the same paging group to remove the MSS 210 from their idle-mode MSS lists.

In one embodiment, a method of verifying availability of a mobile subscriber station that is in an idle-mode includes requesting to a base station by the mobile subscriber station to enter an idle-mode, wherein the base station is associated with a paging group comprising a plurality of base stations, and receiving from the base station an idle-mode response command to enter the idle-mode, the idle-mode response command comprising at least one of the paging identifier, a paging cycle and a paging cycle offset. The method also includes receiving from the base station a paging command comprising an action code associated with performing ranging while the mobile subscriber station is in the idle-mode to verify availability of the mobile subscriber station with respect to the base station, wherein if the ranging is not successfully performed with the base station during a predetermined period, the base station continues to transmit the paging command until a paging retrial count reaches a predetermined threshold.

The paging command may preferably be received when there is no downlink data. When the paging retrial count reaches the predetermined threshold, then the mobile subscriber station may preferably be removed from an idle-mode list maintained by the base station. The removal of the mobile subscriber station of the idle-mode list may preferably be performed in each one of the plurality of base stations in the paging group.

The predetermined period may preferably be the paging cycle. Alternatively, the predetermined period may be based on a time expiration associated with a maximum allotted time for the mobile subscriber station to send a ranging request in response to the paging command from the base station.

When the paging retrial count reaches the predetermined threshold, then the mobile subscriber station may preferably be removed from an idle-mode list maintained by a paging controller. The paging command may preferably be received when there is traffic data to be downlinked to the mobile subscriber station.

In another embodiment, a method of verifying availability of a mobile subscriber station that is in an idle-mode includes requesting to a paging controller by the mobile subscriber station to enter an idle-mode, wherein the paging controller is associated with a paging group comprising a plurality of base stations, and receiving from the paging controller an idle-mode response command to enter the idle-mode, the idle-mode response command comprising at least one of the paging identifier, a paging cycle and a paging cycle offset. The method also includes receiving from the paging controller a paging command comprising an action code associated with performing ranging while the mobile subscriber station is in the idle-mode to verify availability of the mobile subscriber station with respect to the paging controller, wherein if the ranging is not successfully performed with the paging controller during a predetermined period, the paging controller continues to transmit the paging command until a paging retrial count reaches a predetermined threshold.

In yet another embodiment, a method of verifying availability of a mobile subscriber station that is in an idle-mode includes receiving from the mobile subscriber station a request to enter an idle-mode, wherein a base station is associated with a paging group operatively connected to a plurality of base stations, and transmitting to the mobile subscriber station an idle-mode response command to enter the idle-mode in response to the request to enter the idle-mode, the idle-mode response command comprising at least one of the paging identifier, a paging cycle and a paging cycle offset. The method also includes transmitting to the mobile subscriber station a paging command comprising an action code associated with performing ranging while the mobile subscriber station is in the idle-mode to verify availability of the mobile subscriber station with respect to the base station, wherein if the ranging is not successfully performed with the base station during a predetermined period, the base station continues to transmit the paging command until a paging retrial count reaches a predetermined threshold.

Accordingly, the present invention enables a serving BS to check the availability of an MSS. By checking the availability of the MSS, the serving BS prevents the MSS from failing to receive periodic paging messages, such as in cases where the power of the MSS is turned off or the channel status is degraded.

The serving BS may deliver the availability update information pertaining to the MSS to other BSs belonging to the same paging group via the backbone message, thereby preventing the BSs belonging to the same paging group from delivering the paging message to an unavailable MSS.

Furthermore, when the uplink ranging channel is reserved or assigned to the MSS, the serving BS may release the uplink channel assigned to the MSS and the management resources associated with the MSS. In so doing, power consumption of the MSS may be minimized and the idle-mode MSS list may be efficiently updated.

In another embodiment of the present invention, the MSS may choose to power down (or turn off power) during idle-mode. By notifying the base station of its decision to power down, the corresponding information pertaining to the MSS retained by the network (the last base station which granted the MSS to enter into idle-mode or the paging controller) can be erased.

In the embodiment of the present application, a ranging request message and a ranging response message is used to accomplish powering off by the MSS. In operation, if the MSS attempts to power down while in the idle mode, a request to power down is transmitted via the ranging request message to the network (the last base station, which granted the MSS to enter into idle-mode, or the paging controller). Subsequently, the network receiving the power down request via the ranging request message transmits various information to the MSS via the ranging response message.

Figure 4:
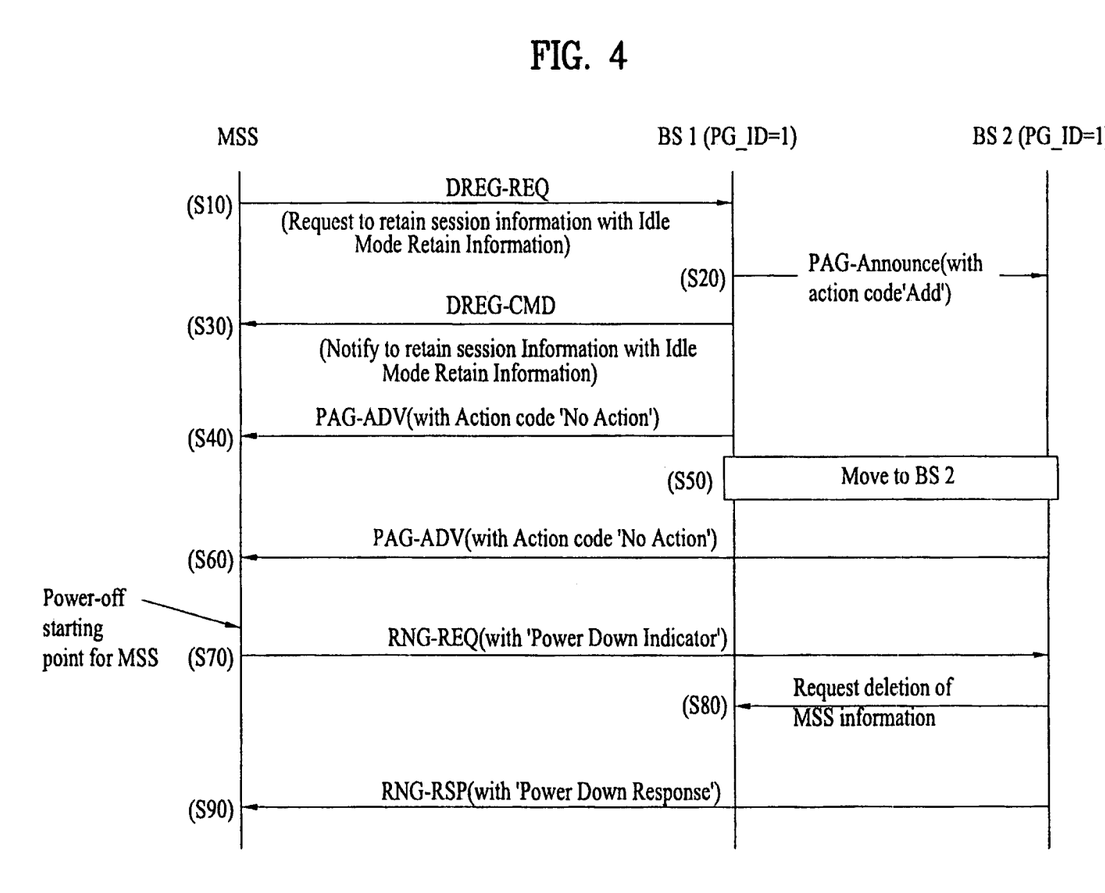
FIG. 4 illustrates a signaling operation of the MSS in idle-mode, according to one embodiment of the present invention

FIG. 4 illustrates a signaling operation of the MSS in idle-mode is described according to an embodiment of the present invention. Referring to FIG. 4, the MSS transmits to a first network entity a request message to request to enter idle-mode via a de-registration request (DREG-REQ) message (S10). The first network entity can be a base station or a paging controller. Included in the request message is a MSS preferred session information which the MSS prefers that the first network entity retain for expedited future re-entry to a network. This MSS preferred session information includes information such as verification information, internet protocol (IP) address information, the MSS capability, management connection identification, and information essential to maintaining network service.

After receiving the request message, the first network entity broadcasts via backbone channel(s) a notification to at least one or all other network entities having the same paging identifications in the paging group so that the corresponding MSS can be added to each network entity of the paging group (S20).

In response to the request message, the first network entity transmits a selected session information to the corresponding MSS via a de-registration response command (DREG-CMD) (S30). The selected session information includes certain MSS service and operational information useful for expediting a future MSS network re-entry from idle-mode. The selected session information can be same, different, or combination thereof as the preferred session information requested by the MSS. Moreover, in the transmission of the DREQ-CMD, other information such as paging cycle, paging offset, and paging identification can be included. The DREG-CMD is a command or a message granting the MSS to enter idle-mode as requested.

Upon receipt of the DREG-CMD from a second network entity, the MSS enters idle-mode. During idle-mode, the MSS can receive a paging message(s) at specified time slots or intervals from the first network entity (S40). The paging message includes various information such as whether there is any downlink traffic or when to terminate idle-mode.

If the MSS moves to the second network entity within the same paging group which has the same paging identification (S50), the MSS may receive paging message(s) from the second network entity at same paging cycle and paging offset as received from the first network entity (S60).

During this period (idle-mode), the MSS can experience power depletion or simply choose to power down. The corresponding MSS transmits to the second network entity a message indicating power off/down (e.g., power down indicator) via a ranging request message (S70). The second network entity then notifies the first network entity that the MSS has powered down and requests the first network entity to de-register or delete the MSS information from the list of MSS in idle-mode (S80). In addition, the second network entity can transmit to a network entity which retains information on the MSS via a message indicating the idle-mode status of the MSS, for example.

At the same time, the MSS may attempt to complete a location update once as part of its orderly power down procedure. This mechanism enables the second network entity to update the exact status of the MSS and to delete all information for the MSS. Moreover, this mechanism enables the second network entity to discontinue idle-mode paging control for the MSS at the time of power down.

After the second network entity notifies the corresponding MSS that the power down location update has been successfully executed, the second network entity may release all idle-mode retaining information related to the MSS (S90). It is possible for the second network entity to fail to updated power down information. In such case, the second network entity (e.g., paging controller) may perform availability check using location update polling. Unavailability of the MSS may be determined and the second network entity shall delete all idle-mode retaining information if the MSS does not answer for the second network entity's location update polling up to 'paging retry count.'

The application of the embodiment of the present invention is not limited to requesting for power down in a coverage area of a different base station. Rather, it is possible to power down in the in the base station which granted idle-mode without ever leaving its coverage area or returning to its coverage area. The notification of powering down by the MSS provides effective and efficient management of the resources in the coverage are of the BS. Instead of BS determining the status of the MSS, by MSS notifying the BS of its intent to power down, the BS can efficiently manage the MSS and the resources associated with the BS.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for power-down of a mobile subscriber station that is in an idle-mode, the method comprising:

transmitting a first request message to a network to enter the idle-mode;

receiving a first response message from the network, the first response message including paging information that includes information related to at least paging grouping identification, paging cycle, or paging offset;

entering the idle-mode and receiving a paging message during paging intervals from the network;

transmitting a ranging request message to the network when attempting to power down, the ranging request message including information indicating power down; and receiving a ranging response message from the network, the ranging response message including information indicating whether a power down location update has been successfully executed, wherein idle-mode paging control is discontinued and idle-mode retaining information is released when the power down location update is successfully executed, and wherein an availability of the mobile subscriber station is checked by the network using location update polling if the power down location update fails, and, if the mobile subscriber station does not answer to a location update poll from the network up to a paging retry count, an unavailability of the mobile subscriber station is determined, and the idle-mode retaining information is deleted.

2. The method of claim 1, wherein the first request message includes preferred session information of the mobile subscriber station to expedite future network re-entry to the network.

3. The method of claim 2, wherein the preferred session information includes at least verification information, Internet protocol address information, or information associated with network service.

4. The method of claim 1, wherein the first response message includes service and operational information for expediting a future network re-entry from the idle-mode.

5. The method of claim 1, wherein the paging message includes information that indicates whether to terminate the idle-mode.

* * * * *